Feb. 8, 1966     D. D. MacLAREN     3,234,121
COUNTERCURRENT HYDROTREATING PROCESS
Filed Jan. 2, 1962
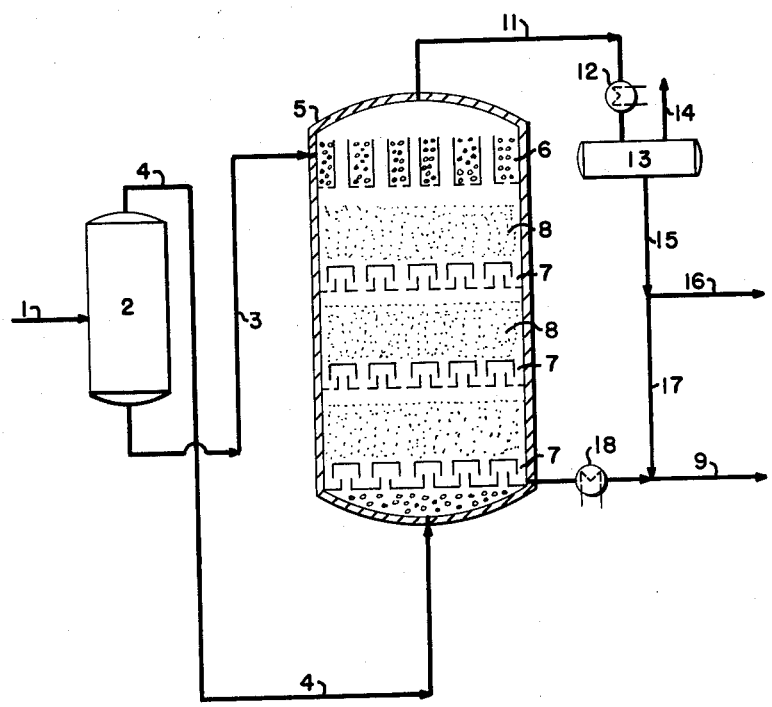
Donald D. MacLaren    Inventor
By *H. M. Feyrer*
Patent Attorney

3,234,121
COUNTERCURRENT HYDROTREATING PROCESS
Donald D. MacLaren, Scotch Plains, N.J., assignor to Esso Research and Engineering Company, a corporation of Delaware
Filed Jan. 2, 1962, Ser. No. 163,745
2 Claims. (Cl. 208—264)

This invention pertains to the treatment of hydrocarbon oils with hydrogen in contact with a fixed bed of catalyst.

Catalytic hydrotreating processes involving the treatment of hydrocarbons, such as shale oil and petroleum oils, at elevated temperatures and in the presence of hydrogen in contact with a catalyst containing an active hydrogenating component have been practiced for some time. In some cases the oil is only mildly treated to remove contaminants such as nitrogen and sulfur compounds, to reduce unsaturation and/or to improve color or stability. More severe treating may be used to secure aromatics hydrogenation, molecular weight reduction, isomerization, cyclization, and the like. Such hydrotreating processes are known by a variety of names, such as hydrofining, hydrodesulfurization, hydrocracking, hydroisomerization, hydroforming and hydrocyclization.

In conventional systems, operating with an oil, an appreciable portion of which is non-vaporizable under the processing conditions, the fed stock is usually passed downwardly in mixed vapor-liquid phase over the catalyst in one or more reactors. Good contacting of both the vapor phase and the liquid phase with the catalyst is difficult to achieve. Liquid bypassing and consequent insufficient catalyst utilization is quite common. Liquid bypassing is particularly disadvantageous when one is attempting to obtain substantially complete elimination of a contaminant such as sulfur. These problems become greatly magnified when one seeks, for example, to scale up a hydrodesulfurization reactor from pilot scale to commercial unit and obtain reactor efficiencies in the latter comparable with those obtained in the pilot unit. This is a particularly serious problem in a commercial unit because of the relatively large diameter of the reactor (5 to 12 feet) over which the liquid and vapor feed must be distributed as it passes through the catalyst bed. Based on experience in packed distillation columns, one would expect that this would be a very poor system for obtaining intimate vapor liquid contacting and good liquid distribution. This has been found to be the case in actual experience. A light catalytic heating oil was subjected to hydrodesulfurization under the following conditions: 400 p.s.i.g., 600° F., 2 v./v./hr. and 900 s.c.f./b. of treat gas In the pilot unit the mass velocity was 85 lbs./hr./sq. ft. while in the commercial unit the mass velocity was 1000 lbs./hr./sq. ft. The following table summarizes the results that were obtained in these runs.

| Mid Boiling Point of Fraction | Percentage of Sulfur Remaining | |
| --- | --- | --- |
| | Pilot Unit | Commercial Unit |
| 365–370° F | 0.54 | 55.0 |
| 425° F | 0.53 | 20.0 |
| 475° F | 0.40 | 27.0 |
| 550° F | 3.60 | 34.0 |
| 610–615° F | 19.00 | 53.0 |

It may be readily seen from this data that the commercial plant was considerably poorer than the pilot unit. The reactor efficiency for this light catalytic heating oil was only about 10 percent. Equally important, however, is the efficiency as a function of boiling range. In the case of the pilot unit that portion of the feed in the vapor phase (i.e. midboiling range below about 510° F.) was desulfurized to 99+%. However, as the transition occurred into the liquid phase region, the extent of desulfurization decreased as the boiling point of the fraction increased. This would be expected with good liquid distribution and vapor liquid contacting due to diffusional limitations in the liquid phase as compared to reaction rate limitations for the vapor phase. As may be seen from the above data, however, desulfurization of the vapor phase in the commercial unit is not particularly better than the liquid phase. This indicates that there is not only a liquid contacting problem but also a vapor liquid contacting problem. The vapor must be brought into equilibrium with the liquid so that the vapors can dissolve in the liquid, diffuse to the catalyst surface and react. Without this vapor-liquid transfer, reaction of the vapor phase is reduced.

Moreover, when one is attempting to obtain molecular weight reduction, e.g., cracking or hydrocracking of the oil, it is difficult to keep the liquid oil phase in contact with the catalyst for the optimum time without overexposing and, in certain instances, underexposing the light vaporous products of the cracking. In other words, satisfactory exposure to the catalyst of the vapor and liquid components of a mixed phase feed is almost impossible to attain with existing processes and equipment. In order to improve contacting it has been proposed to split the feed either within or exteriorally of the reactor and pass the liquid portion through one catalyst bed and the vapor portion through another catalyst bed in the same large vessel or in different vessels.

The present invention is concerned with a process for improving feed-catalyst contacting in the hydrotreatment of oils, a substantial portion of which is liquid at the conditions of hydrotreating. It has been found that good contacting of both liquid and vapor can be obtained in a fixed bed hydrodesulfurization system by splitting the feed into two fractions which will be all liquid and all vapor under normal reaction conditions and feeding the liquid fraction to the top of the reactor and the vapor fraction and treat gas to the bottom of the reactor. Good liquid distribution and gas-liquid contacting is provided by a number of bubble cap trays or the like suitably spaced within the reactor. The liquid is periodically redistributed as it flows down through the reactor and the gas periodically recontacts the liquid on the bubble cap trays as it flows up through the reactor. In this way good liquid distribution and good gas-liquid equilibrium is assured.

The present invention is particularly applicable to petroleum fractions boiling within the range of from about 200° F. to about 1000° F. such as kerosene fractions boiling in the range of about 300–500° F., diesel fuels boiling in the range of about 300 to 650° F. and heating oil and gas oils having end boiling temperatures of up to about 1000° F. Usually the feed stocks treated advantageously in accordance with the present invention are of such a boiling range that about 1.0 to 90% thereof will be vaporized under the temperature and pressure conditions obtaining in the hydrotreating reaction zone, and, hence, at least 10% remains liquid.

Suitable catalysts for the hydrotreating of hydrocarbon feed stocks in accordance with the present invention include molybdenum oxide or sulfide, nickel-tungsten sulfide and, most frequently, cobalt molybdate or mixtures of cobalt oxide and molybdenum oxide supported upon an alumina-containing support or base, preferably activated or adsorptive alumina. In general, such catalysts are prepared by first forming adsorptive alumina particles in any suitable or known way and then compositing the active hydrogenation catalyst component thereon. Molybdenum oxide can, for example, be added as a slurry or it may be applied as a solution of ammonium molybdate. The cobalt oxide can be conveniently added as a salt such as cobalt nitrate or acetate, salts which are readily decomposed to cobalt oxide and volatile materials. The cobalt oxide and the molybdenum oxide may be provided in equimolar amounts or a molecular excess of one over the other may be used. Suitable catalysts contain from about 5 to about 25 wt. percent of cobalt oxide and molybdenum oxide with the ratio of the former to the later in the range of from about one to five to about five to one. The catalyst may, if desired, be given a pretreatment with hydrogen sulfide, carbon disulfide or the like in known manner in order to activate the same.

The hydrofining reaction conditions vary somewhat depending upon the nature of the feed stock, the character and quantity of the impurity or contaminant to be removed and the degree of improvement desired. Reaction temperatures are generally within the range of from about 500 to about 800° F. and pressures may vary from about 50 p.s.i.g. up to about 1500 p.s.i.g., preferably about 200–400 p.s.i.g. Feed rates to the hydrofining reactor may vary from about 0.25 to about 10 v./v./hr. Hydrogen or hydrogen-rich treat gas is supplied to the hydrofining reaction zone at the rate of from about 30 to 3000 s.c.f./b. with hydrogen consumption in the treatment ranging from about 1 to 1000 s.c.f./b. and is normally in the range of from about 30 to 400 s.c.f./b.

In the hydrofining of the foregoing hydrocarbon fractions under the conditions described there is a gradual deactivation of the catalyst due to the accumulation of carbonaceous or other deactivating deposits thereon. When this occurs the catalyst can be regenerated by discontinuing the supply of reactants, stripping hydrogen and hydrocarbon materials from the catalyst particles with steam and then regenerating the catalyst by burning the carbonaceous deposits therefrom with a mixture of air and a diluent such as steam or flue gas to limit the temperature reached in burning to the range of from about 750–1050° F.

The present invention will be more readily understood with reference to the accompanying drawing illustrating a diagrammatic flow plan of the process in accordance with this invention. In the drawing preheated fresh feed and treat gas are supplied through inlet line 1 to flash drum 2. The temperature and pressure conditions in flash drum are essentially the same as in the hydrofining reaction zone so that there will separate therein the hydrogen treat gas and the portion of the hydrocarbon feed that will be in vapor form during the hydrofining operation from that portion of the feed which remains unvaporized under the hydrofining reaction conditions. The unvaporized portion is withdrawn from the bottom of flash drum 2 and charged via line 3 to the upper portion of hydrofining reactor vessel 5. The treat gas and vaporized portion of the feed are taken overhead from flash drum 2 and charged via line 4 to the bottom of reactor vessel 5.

The reactor vessel 5 is provided with an inlet tray 6 containing inert fill to assist in the distribution of the incoming liquid to the vessel and spaced bubble cap trays or the like 7 provide for good liquid gas contacting. Suitable restriction orifices are provided in the several trays to distribute the liquid leaving each of the trays. Beds of catalyst 8, preferably a cobalt oxide-molybdenum oxide on activated alumina, are provided above each of the bubble cap trays 7. Hydrofined liquid product is withdrawn from the lowermost tray 7 via line 9 and cooler 18 and passed to hydrofined product storage. The treat gas and the vaporous feed fraction supplied to the bottom of the vessel 5 via line 4 pass upwardly therethrough countercurrently to the downflowing liquid. In the process in accordance with the present invention there is good liquid-liquid distribution over the catalyst and, most importantly, there is excellent vapor-liquid contacting. In the present arrangement the vapor is effectively brought into equilibrium with the liquid so that vapors can dissolve in the liquid, diffuse to the catalyst surface and react. Without this vapor-liquid transfer, reaction of the vapor phase is reduced.

The vaporous fractions of the feed and the accompanying gases are taken overhead from reactor 5 through line 11, cooled and condensed in 12 and discharged into gas-liquid separator 13. The gaseous products are removed via line 14 and discharged as fuel, or if desired, subjected to purification in known manner to produce a hydrogen-containing gas of sufficient purity to recycle in the process. The desulfurized or hydrofined liquid product is withdrawn from separator 13 via line 15 and passed to separate light product storage via line 16 or passed via line 17 into line 9 for mixing with the desulfurized liquid product therein and thence to storage.

The following example is illustrative of the present invention.

*Example*

A 430/610° F. light catalytic cycle oil was hydrofined to remove sulfur and nitrogen in accordance with the present invention. The feed stock had the following inspections:

| | |
|---|---|
| ° API | 29.3 |
| AP °F | 120 |
| Br No. | 13.5 |
| S p.p.m. | 3810 |
| N p.p.m. | 40 |
| Composition, wt. percent: | |
| Paraffins | 31.5 |
| Condensed naphthenes | 9.6 |
| Non-condensed naphthenes | 9.2 |
| Aromatics | 49.7 |
| Distillation: | |
| IBP °F | 402 |
| 10% °F | 480 |
| 30% °F | 502 |
| 50% °F | 524 |
| 70% °F | 544 |
| 90% °F | 578 |
| FBP °F | 612 |

The feed and 100 s.c.f./b. of hydrogen containing treat gas were preheated to 650° F. at the hydrofining pressure level of about 400 p.s.i.g. Under these conditions approximately 30% of the feed vaporized. The 70% unvaporized portion of the feed was fed to the top of the reactor while the vaporized portion plus treat gas was fed to the bottom. Four bubble cap plates with liquid redistributors were arranged equally spaced in the reactor. The catalyst used was cobalt molybdate on alumina catalyst containing approximately 3.5 wt. percent CoO and 12.5 wt. percent MoO$_3$. The feed was charged to the reactor at a space velocity of 1.0 v./v./hr. Treated liquid was withdrawn at the reactor bottom and vaporized product and treat gas from the reactor top. These streams were combined and cooled to condense out the treated feed. The liquid product was found to contain 3.5 p.p.m. of nitrogen and 114 p.p.m. of sulfur, representing 91 and 97% removal respectively. Approximately 400 s.c.f./b. of hydrogen were consumed. In a second case the same feed and hydrofining conditions were used but under conventional downflow, mixed phase conditions. In this case less than a 0.5 v./v./hr. was needed to give the same percent sulfur and nitrogen removal, thus showing the marked improvement effected by use of this invention.

The foregoing description contains a limited number of embodiments of the present invention. It will be understood that numerous variations thereof are still within the scope of the present invention.

What is claimed is:

1. The method of hydrotreating petroleum fractions boiling in the range of from about 200° F. to about 1000° F. at least 10% of which remains liquid during the hydrotreating which comprises heating the petroleum fraction and hydrogen-rich treat gas to reaction temperature, flashing the preheated feed at hydrotreating pressure into an all liquid and an all gaseous fraction, feeding the all liquid fraction to the top of a hydrotreating reaction zone for passage downwardly therethrough over a fixed bed of hydrogenating catalyst, feeding the all gaseous fraction directly to the bottom of said reaction zone for flow upward over said fixed bed of catalyst countercurrent to said downflowing liquid, periodically collecting the downflowing liquid as pools and discharging the pooled liquid at a large number of points over the cross section of the reaction zone to insure uniform distribution of the downflowing liquid, withdrawing hydrotreated liquid product from the bottom of said reaction zone and withdrawing hydrotreated gaseous fraction including excess treat gas from the top of said reaction zone.

2. The method of hydrotreating petroleum fractions boiling in the range of from about 200° F. to about 1000° F. at least 10% of which remains liquid during the hydrotreatnig which comprises heating the petroleum fraction and hydrogen-rich treat gas to reaction temperature, flashing the preheated feed at hydrotreating pressure into an all liquid and an all gaseous fraction, feeding the all liquid fraction to the top of a hydrotreating reaction zone for passage downwardly therethrough over a fixed bed of hydrogenating catalyst, feeding the all gaseous fraction directly to the bottom of said reaction zone for flow upward over said fixed bed of catalyst countercurrent to said downflowing liquid, periodically collecting the downflowing liquid as pools, passing the ascending gaseous fraction through the pools of liquid to effect dissolution of the gaseous fraction in the liquid and discharging the pooled liquid at a large number of points over the cross section of the reaction zone to insure uniform distribution of the downflowing liquid, withdrawing hydrotreated liquid product from the bottom of said reaction zone and withdrawing hydrotreated gaseous fraction including excess treat gas from the top of said reaction zone.

References Cited by the Examiner
UNITED STATES PATENTS

| | | | |
|---|---|---|---|
| 2,793,170 | 5/1957 | Stiles et al. | 208—216 |
| 2,844,517 | 7/1958 | Inwood | 208—210 |
| 2,877,099 | 3/1959 | Bowles | 208—212 |
| 2,883,337 | 4/1959 | Hartley et al. | 208—254 |
| 2,893,942 | 7/1959 | Berg | 208—213 |
| 2,937,138 | 5/1960 | Bevther | 208—213 |
| 2,952,626 | 9/1960 | Kelley et al. | 208—216 |
| 3,124,526 | 3/1964 | Butler et al. | 208—216 |

DELBERT E. GANTZ, *Primary Examiner.*
ALPHONSO D. SULLIVAN, *Examiner.*